April 10, 1928.

H. I. LIPPARD

SEWING NEEDLE

Re. 16,926

Original Filed April 7, 1926

Herman Jacobs Sifford INVENTOR.

BY

Jacob Schneyer & Clearfield ATTORNEY.

Reissued Apr. 10, 1928. Re. 16,926

UNITED STATES PATENT OFFICE.

HERMAN I. LIPPARD, OF UPPER DARBY, PENNSYLVANIA.

SEWING NEEDLE.

Original No. 1,619,142, dated March 1, 1927, Serial No. 100,338, filed April 7, 1926. Application for reissue filed April 6, 1927. Serial No. 181,577.

This invention is an improvement upon the type of sewing needle shown in the Patent Number 234,371, issued to Benjamin, on November 9, 1880, or Patent Number 324,030, issued to Kratz, on August 11, 1885, and its object is, among other things, to further facilitate the threading operation.

The improvement consists primarily in extending one of the sides of the needle so that it forms an extended prong which serves both as a guide for the threading element and also as a lever for opening the threading slit, thus eliminating entirely the careful step necessary in guiding the threading element in threading the needles disclosed in the above mentioned patents.

This and other advantages derived from the herein to be described type of needle will become apparent from the following detailed description.

Figure 1:
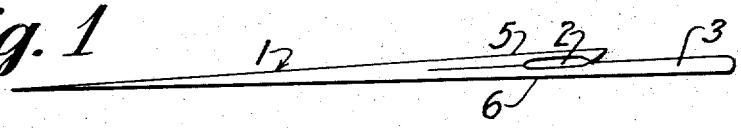
Figure 2:
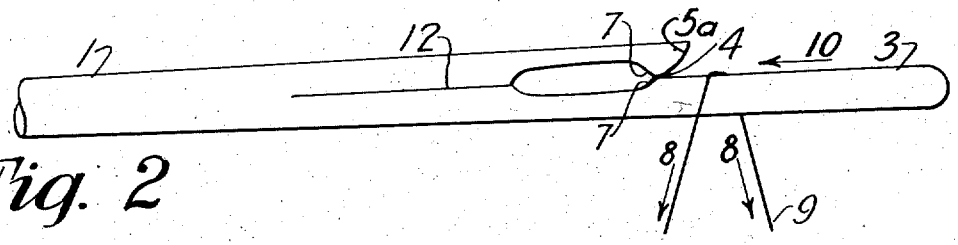
Figure 3:
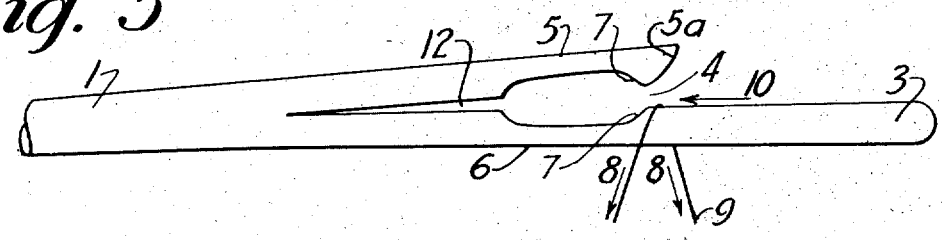
Figure 4:
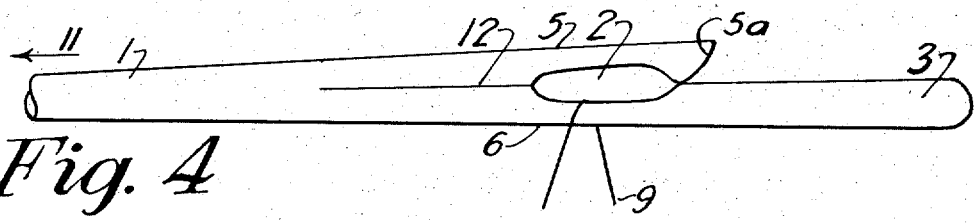

In the drawings Figure 1 is a plan view of the needle; Figures 2, 3 and 4 are fragmentary views on a large scale showing the rear or eye end of the needle and also the successive steps in the threading operation.

Referring specifically to the drawings 1 designates the needle, 2 designates the eye, situated at the rear, head or shank end thereof, farthest from the point, as is the practice in sewing needles; 4 designates a slit at the rear end of the eye, the said slit being adapted to open and admit the threading unit into the eye when the spring arms, 5 and 6, are separated by pressure upon the prong 3, and against the bevel formed on the lateral end $5^a$ of prong 5; 12 designates a slit at the front end of the eye and extending towards the point end of the needle, the said slit terminating short of the point of the needle as shown. This slit imparts a greater degree of resiliency and gives a greater amplitude to the spring arms 5 and 6. For the purpose of removing any possible ambiguity or misunderstanding in the interpretation of the specification and the claims, the following definitions are given:—

By the inner surface or side of an arm or prong is meant that surface or side which is adjacent to and borders on the slit and eye.

By the outer surface of an arm or a prong is meant that surface which is farthest away from the slit and the eye and diametrically opposite the inner surface.

By a straight surface is meant a surface whether plane, concave or convex all the elements of which are substantially straight lines.

Elements are herein used in the sense generally accepted in solid and analytical geometry.

The use of the needle is illustrated in connection with the attachment of a tag to a garment. The applicant desires it to be understood that the use of the needle for tagging purposes is by the way of illustration only and not by the way of limitation. Any other threading element for any other purpose in which a sewing needle is used may be substituted for the attaching cord of the tag herein used as an illustration.

Loop 9 of the attaching cord is slipped over the prong 3, as shown in Figure 2, the said cord bearing against the inner surface of the said prong as shown, and pressure is applied in the direction of the arrows 8 while the thread is being pushed or pulled in the direction of the arrow 10. The pressure applied causes the prongs 5 and 6 to become separated thereby distending the opening caused by the slit 4. See Figure 3. The thread assumes the positions shown successively in Figures 3 and 4, Figure 3 showing the attaching cord as it passes through the slit, while Figure 4 shows the needle completely threaded.

The point of the threaded needle is now inserted into the garment to be tagged and pulled in the direction shown by the arrow 11—Figure 4. The spring arms 5 and 6 take all of the retarding frictional pressure exercised by the garment. The thread, therefore, slides freely through the opening formed in the garment by the needle until it reaches the point where the loop end attached to the tag strikes the garment. This causes pressure to be exerted upon the thread per se in such a direction that the thread presses against the beveled edges 7 at the rear end of the eye. This pressure is sufficient to separate the spring arms and permits the needle to slide away from the cord, the steps being the reverse in direction and sequence of those illustrated in Figures 2, 3, and 4. This leaves the tag anchored in the garment.

Having described my invention I claim:

1. A tagging needle having an eye at the head end thereof, a slit at the rear end of said eye, a slit at the front end of said eye extending towards the point or front end of said needle, a beveled edge at the rear end of said eye, the said bevel sloping towards the slit at the rear end, arms formed by the said slits, one of the arms being longer than the other.

2. A tagging needle having an eye at the head end thereof, a slit at the rear end of said eye, a slit at the front end of said eye extending towards the point or front end of the needle, beveled edges at the rear end of said eye, the said bevels extending towards the slit at the rear end of the eye, arms formed by the said slits, a prong extending rearwardly from the slit in the rear end of said eye, the said prong being formed by one of the arms and integral therewith, the prong arm being longer than the remaining arm.

3. A sewing needle having an eye at the rear end thereof, a slit at the rear end of said eye, a slit at the front end of said eye extending towards the point or front end of said needle, a beveled surface at the rear end of said eye, the said bevel sloping towards the slit at the rear end, and arms formed by the said slit.

4. A tagging needle having an eye at the head end thereof, a slit at the rear end of said eye, a beveled edge within and at the rear end of said eye, the said bevel sloping towards the slit at the rear end, arms formed by the said slit, a prong substantially straight on its inner surface formed on one of said arms extending a distance rearwardly from said slit equal to at least three times the diameter of said prong, thus making the prong arm considerably longer than the remaining arm, the said prong further having its inner surface lower than the outer surface of the remaining arm, the said prong forming a guiding surface for a threading element and serving as a lever for opening the said slit whereby the said needle is adapted to be threaded rapidly.

5. A needle of the class described having an eye adjacent the rear end thereof, the said eye terminating in a slit at its rear end to permit the insertion of a thread or cord, a beveled edge within and at the rear edge of said eye, the said bevel sloping towards the slit at the rear end, the said eye and said slit forming two arms, one of said arms being provided with means for rapidly threading said needle, the said means consisting of a prong fashioned on said arm, the said prong extending a distance rearwardly from said slit and from the said other arm equal to at least three times the diameter of said prong, the inner surface of said prong being lower than the outer surface of the remaining arm and having its elements substantially parallel to the axis of the needle.

In testimony whereof he affixes his signature.

HERMAN I. LIPPARD.